(12) United States Patent
Wu et al.

(10) Patent No.: US 6,909,423 B2
(45) Date of Patent: Jun. 21, 2005

(54) METHOD FOR INPUTTING COMMANDS IN A KEYPAD

(75) Inventors: Yen-Chun Wu, Shu Lin (TW); Li-Chun Huang, Chung Ho (TW)

(73) Assignee: ORtek Technology, Inc., Chung Ho (TW)

( * ) Notice: Subject to any disclaimer, the term of this patent is extended or adjusted under 35 U.S.C. 154(b) by 227 days.

(21) Appl. No.: 10/278,831

(22) Filed: Oct. 24, 2002

(65) Prior Publication Data

US 2004/0027334 A1 Feb. 12, 2004

(30) Foreign Application Priority Data

Aug. 9, 2002 (TW) .......................................... 91118005

(51) Int. Cl.[7] ................................................ G09G 5/00
(52) U.S. Cl. ........................ 345/168; 345/173; 341/22; 463/37
(58) Field of Search ................................ 345/156, 157, 345/168–173; 341/21–35; 463/37–38

(56) References Cited

U.S. PATENT DOCUMENTS

| | | | | |
|---|---|---|---|---|
| 5,525,978 A | * | 6/1996 | York et al. .................... | 341/22 |
| 6,310,608 B1 | * | 10/2001 | Kaply et al. ................. | 345/168 |
| 6,426,742 B1 | * | 7/2002 | Tai .............................. | 345/168 |
| 6,445,381 B1 | * | 9/2002 | Chou .......................... | 345/168 |
| 6,621,484 B1 | * | 9/2003 | Yee ............................. | 345/168 |
| 6,630,926 B2 | * | 10/2003 | Challener et al. ........... | 345/168 |

* cited by examiner

*Primary Examiner*—Sumati Lefkowitz
*Assistant Examiner*—Alexander S. Beck
(74) *Attorney, Agent, or Firm*—Bacon & Thomas, PLLC

(57) ABSTRACT

The present invention is to provide a method for inputting commands in a keypad comprising receiving a signal from an electronic device by the keypad or sending the signal to the electronic device; determining a type of an operating system (OS) incorporated in the electronic device by the keypad; and setting the keypad as a use mode compatible to the determined OS based on the type of the determined OS; whereby in the use mode of the keypad states of Num Lock keys of a keyboard and the keypad of the electronic device are independent without interaction therebetween, and the keypad is capable of inputting a key code coincident with the state of the Num Lock key of the keypad based on the current state of the Num Lock key thereof.

16 Claims, 7 Drawing Sheets

METHOD FOR INPUTTING COMMANDS IN A KEYPAD

FIELD OF THE INVENTION

The present invention relates to keypad arrangement and more particularly to a method for inputting commands in an auxiliary keypad coupled to a notebook computer.

BACKGROUND OF THE INVENTION

A keyboard of a conventional desktop computer shown in FIG. 1 consists of four regions, namely alphanumeric keys, numeric keys, function keys, and cursor movement keys. Further, additional multimedia function keys are provided in a multimedia keyboard. An arrangement of keys in a keyboard of a notebook computer is different from that of the desktop computer due to a compactness of the notebook computer. Such arrangement of keys in the keyboard of the notebook computer is shown in FIG. 2 in which the numeric keys are combined with the alphanumeric keys. In using the keyboard, a frequent switching from a key in the alphanumeric keys to a key in the numeric keys or vice versa by pressing a Num Lock key is possible. This can cause inconvenience to a user. An example of this is described with respect to an editing of document as below. The user has to press the Num Lock key prior to switching from an alphabetic key to a numeric key. It can consume a substantial amount of time if the document is large. Also, the user has to perform the switching again if a necessary switching was not performed in a previous operation. Hence, this is not desirable.

Moreover, a computer may not incorporate a complete keyboard in some applications. For example, the computer may simply incorporate a keyboard for inputting digits or a device for moving cursor. Hence, except mouse and trackball, the computer may incorporate a keyboard consisting of numeric keys, cursor movement keys, or function keys in a certain application.

In this regard, a small input device such as a keypad has been developed by keyboard manufacturers. The keypad serves as an auxiliary device and an expansion of th keyboard, or alternatively as a replacement of the numeric keys, the cursor movement keys, or the function keys. In other words, the keypad is incorporated as a part of the keyboard as shown in FIG. 3.

An additional driver is required to be installed in the notebook computer prior to using the keypad. This operation is very inconvenient. Further, an operation such as on or off of a Num Lock key of the keypad is controlled by the keyboard of the notebook computer in use. As such, a user may feel a degree of limitation in operating the keypad. This also causes troubles to the user in use. In this regard, the use of the keypad is very inconvenient.

Japanese Laid-open Patent No. 3,242,094 filed Mar. 3, 2000, issued to Sinju Corporation on Oct. 19, 2001 disclosed a switching method for command input in a keypad. Claim 1 of the patent is characterized in that (a) a keyboard or keypad is not required to be in a predetermined state; (b) a current state of the keyboard or the keypad is stored in a memory of the keypad irrespective of the state of the keyboard or the keypad; and (c) upon pressing of any key of the keypad, a software associated with the keypad is activated to determine whether an internal sate of the keypad is the same as that of the keyboard, a positive result of the determination causing a key code of a corresponding key of the keyboard to be sent to a computer for adjusting the keypad and the keyboard to be in the same state, in response to which the keypad sends the received key code to the computer, and thereafter sends the key code of a Num Lock key to the computer for causing the keyboard to return to its original state and the keypad to maintain its original state. In view of the above, the keypad and the keyboard are independent in operation without an interaction therebetween irrespective of the state of the keyboard or the keypad. This can facilitate an input of a digit or alphabet.

However, the prior art method suffered from several disadvantages. For example, (1) The keypad is designed specially for IBM computers or IBM compatible computers. The IBM computer incorporates a Microsoft Windows operating system (OS). Hence, the keypad is designed to operate under the Microsoft Windows OS rather than a Macintosh (Mac) OS adopted by Apple Computer, Inc. In other words, the keypad is incompatible with the Mac OS. A couple of examples are illustrated in detail below.

(a) In a case that both the keypad and the keyboard are coupled to the IBM computer a state of the Num Lock key of the keypad is found to be different from that of the keyboard. That is, for example, the Num Lock key of the keyboard is off and that of the keypad is on or vice versa. In response to a pressing of any key, before or after issuing a corresponding key code of the pressed key, a key code of Num Lock key must be issued by means of the method. It aims at causing a state of the keyboard to be the same as that of the keypad prior to issuing the corresponding key code of the pressed key. Thus, the computer can receive the corresponding key code of the pressed key having the same state as the keyboard. Thereafter, the state of the keyboard is returned to its original one in response to the receiving of the corresponding key code of the pressed key.

(b) However, following facts are observed in using the keypad and the keyboard on an Apple computer. There is no Num Lock key in a keyboard of the Apple computer. A key code of Num Lock key of either keypad or keyboard is viewed as a key code of clear key under a calculator mode of Mac OS. Such key code of clear key may delete all input data. As an end, the state of the keyboard and that of the keypad are not the same. In response to a pressing of any key on the keypad, before or after issuing a corresponding key code of the pressed key, a key code of the clear key is issued. It means to clear all input data. As a result, it is impossible for the keypad to input data to a computer under a Mac OS environment.

(2) There are no cursor movement keys, function keys, and a Num Lock key provided on the numeric keys of keypad of a computer incorporated a Mac OS. Hence, unlike keypad or keyboard of a computer incorporated a Microsoft Windows OS there is no need to use the Num Lock key for switching the numeric keys into the cursor movement keys or the function keys.

(3) A user may be confused in operating keys as using an Excel program under the Microsoft Windows OS. This is because a state of Num Lock key of keyboard is displayed automatically by the Excel program under the Microsoft Windows OS. Typically, a user may operate a keypad by observing a state of the Num Lock key displayed by the Excel since there is no indicator about a state of the Num Lock key on the keypad. As a result, errors may occur in operation.

For example, in response to an entering of the Excel program a "Num" is automatically displayed on a taskbar by the Excel as it has determined that a Num Lock key of the keyboard to be on. In response to a receiving of "-" key code, the Excel may perform either action based on a state of the "Num" displayed on the taskbar. For example, a "-" character is displayed corresponding to a receiving of the "-" key code as the Excel has determined that a Num Lock key of the keyboard is on. Otherwise, an EXT is performed corresponding to the receiving of the "-" key code as the Excel has determined that the Num Lock key of the keyboard is off.

A key code of a pressed Num Lock key of a keypad cannot transmit to a computer as taught by the above patent entitled "Switching Method For Command Input In A Keypad" issued to Sinju Corporation. As a result, the user cannot change a state of the Num Lock key of the keyboard as desired.

In view of the above, a number of disadvantages are found in any of the above identified computers under either the Mac OS or the Microsoft Windows OS. This in turn causes inconvenience and troubles. Thus, it is desirable to provide a novel method in order to overcome the above disadvantages of the prior art.

SUMMARY OF THE INVENTION

A primary object of the present invention is to provide a method for inputting commands in a keypad comprising receiving a signal from an electronic device by the keypad or sending the signal to the electronic device; determining a type of an operating system (OS) incorporated in the electronic device by the keypad; and setting the keypad as a use mode compatible to the determined OS based on the type of the determined OS; whereby in the use mode of the keypad states of Num Lock keys of a keyboard and the keypad of the electronic device are independent without interaction therebetween, and the keypad is capable of inputting a key code coincident with the state of the Num Lock key of the keypad based on the current state of the Num Lock key thereof. Thus, in response to a pressing of a key on the keypad a key code corresponding to a pressed key is issued by the keypad. By utilizing this, it is possible of overcoming the disadvantage of the prior art, i.e., an error is occurred by an operation of the keyboard and the keypad coupled to the electronic device under different OSs.

The above and other objects, features and advantages of the present invention will become apparent from the following detailed description taken with the accompanying drawings.

DETAILED DESCRIPTION OF THE PREFERRED EMBODIMENTS

The invention is directed to a method for inputting commands in a keypad comprising receiving a signal from an electronic device by the keypad or sending the signal to the electronic device; determining a type of an operating system (OS) incorporated in the electronic device by the keypad; and setting the keypad as a use mode compatible to the determined OS based on the type of the determined OS; whereby in the use mode of the keypad states of Num Lock keys of a keyboard and the keypad of the electronic device are independent without interaction therebetween, and the keypad is capable of inputting a key code coincident with the state of the Num Lock key of the keypad based on the current state of the Num Lock key thereof. Thus, in response to a pressing of a key on the keypad a key code corresponding to a pressed key is issued by the keypad. By utilizing this, it is possible of overcoming the disadvantage of the prior art, i.e., an error is occurred by an operation of the keyboard and the keypad coupled to the electronic device under different OSs.

In the invention, a keyboard controller of the keypad acts to control normal operations of electronic components and circuitry of the keypad. The keyboard controller comprises a buffer and a scan code in which the buffer can store a keystroke signal generated by a pressed key of the keypad and the scan code is a key code of any of individual keys for comparing with a signal of the generated keystroke of the pressed key. The keyboard controller can issue an interrupt request to a central processing unit (CPU) of the electronic device for requesting a halt of current executing tasks, assigning a task priority to the keypad, and requesting the CPU to process tasks of the keypad in a first priority manner. Thus, the CPU can process signal data issued by the keypad in real time. As such, the keypad may perform the following steps in response to a pressing of a key on the keypad:

First, a keystroke is generated corresponding to a pressed key. Next, the keyboard controller finds a corresponding key code from the scan code based on the keystroke. Then store the key code in the buffer. Next, the keyboard controller issues an interrupt request to the CPU. The CPU then loads a service program corresponding to the interrupt request and executes the same. Finally, the CPU reads the key code from the buffer.

In the invention, an interface is implemented for signal data transfer between the keypad and the electronic device. The Interface is a universal serial bus (USB) incorporated in an IBM computer or an IBM compatible computer, the USB incorporated in an Apple computer, or the like.

Figure 1:
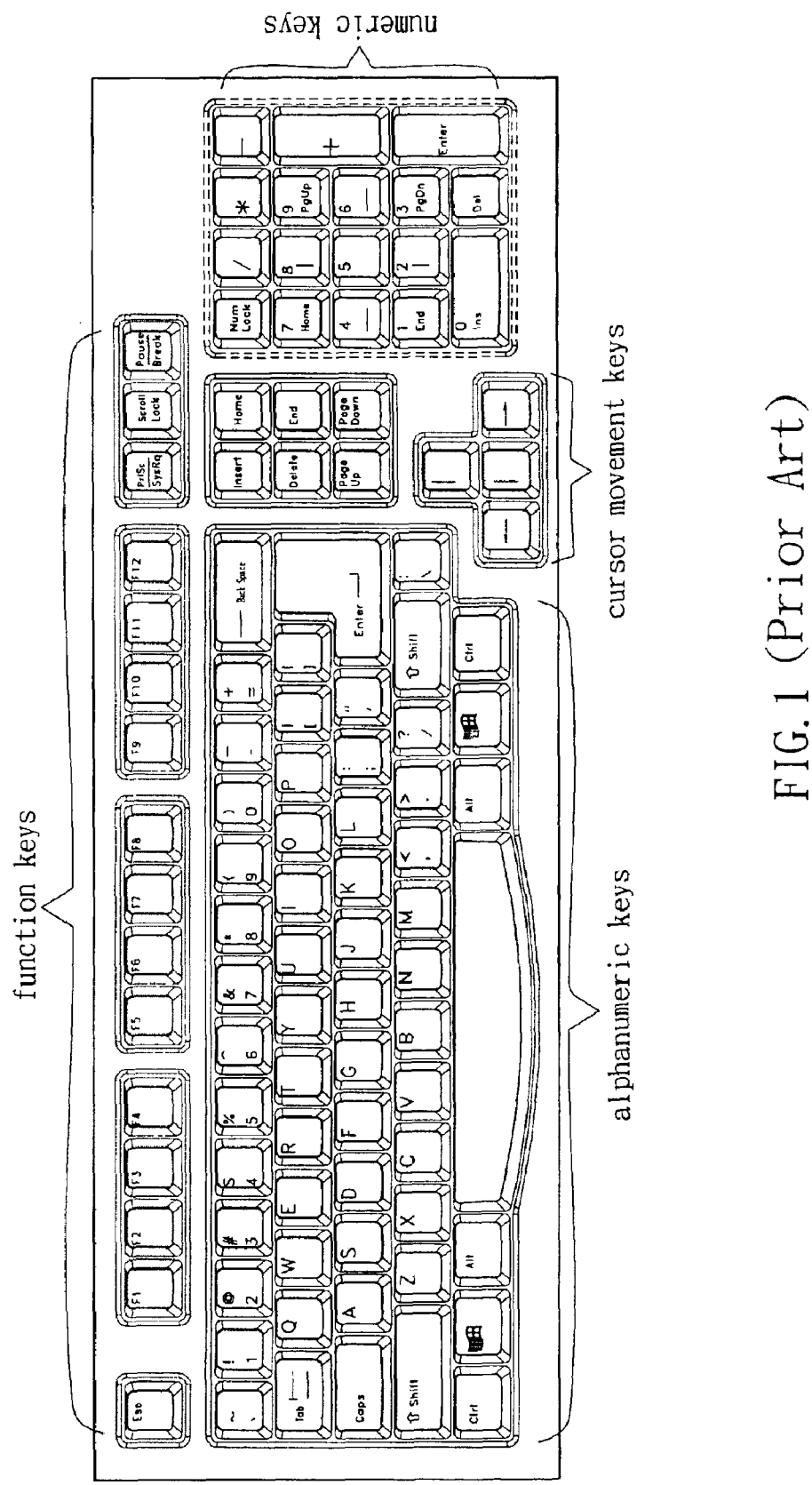
FIG. 1 is a top plan view of a conventional keyboard of computer.
Figure 2:
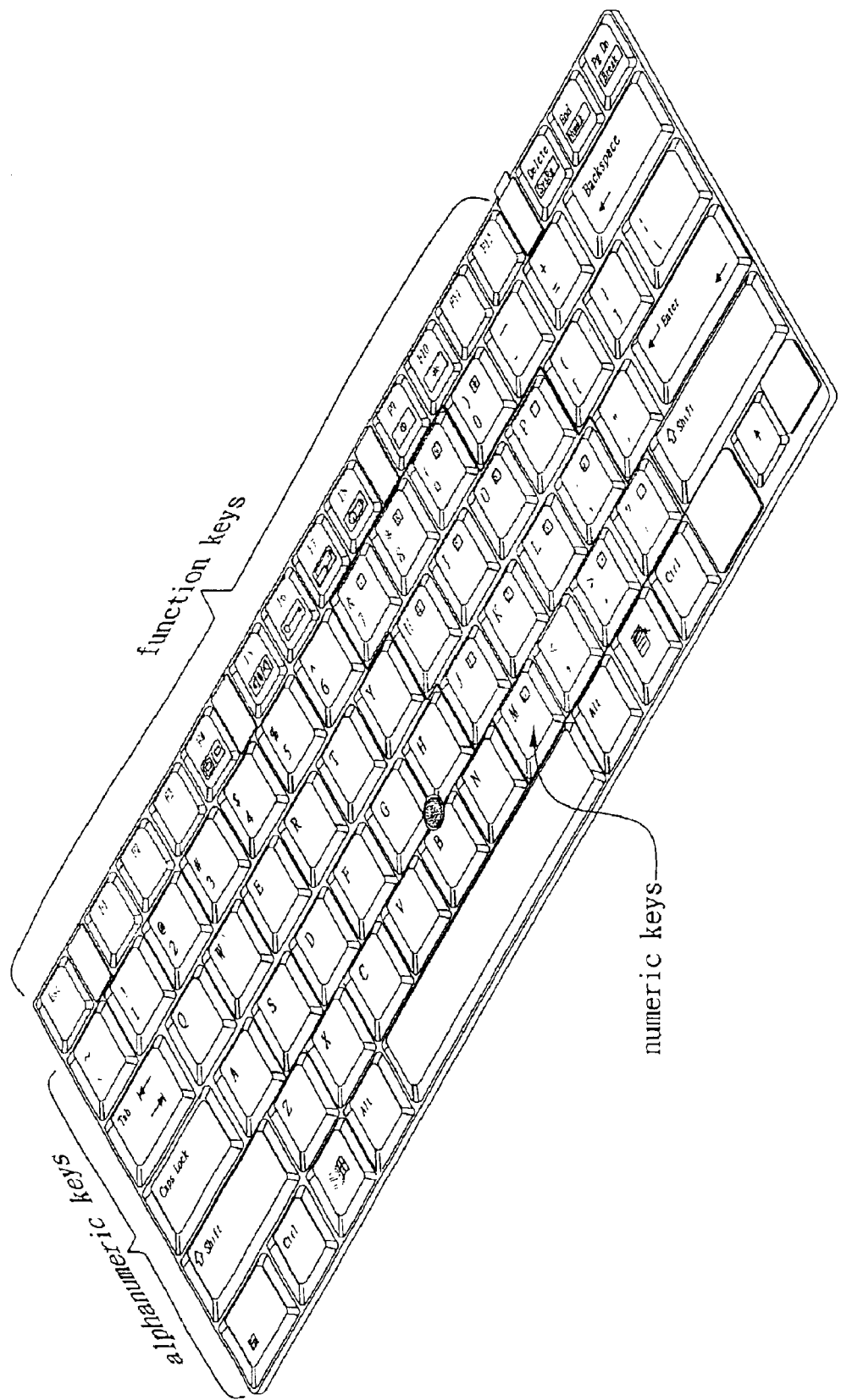
FIG. 2 is a perspective view of a conventional keyboard of notebook computer.
Figure 3:
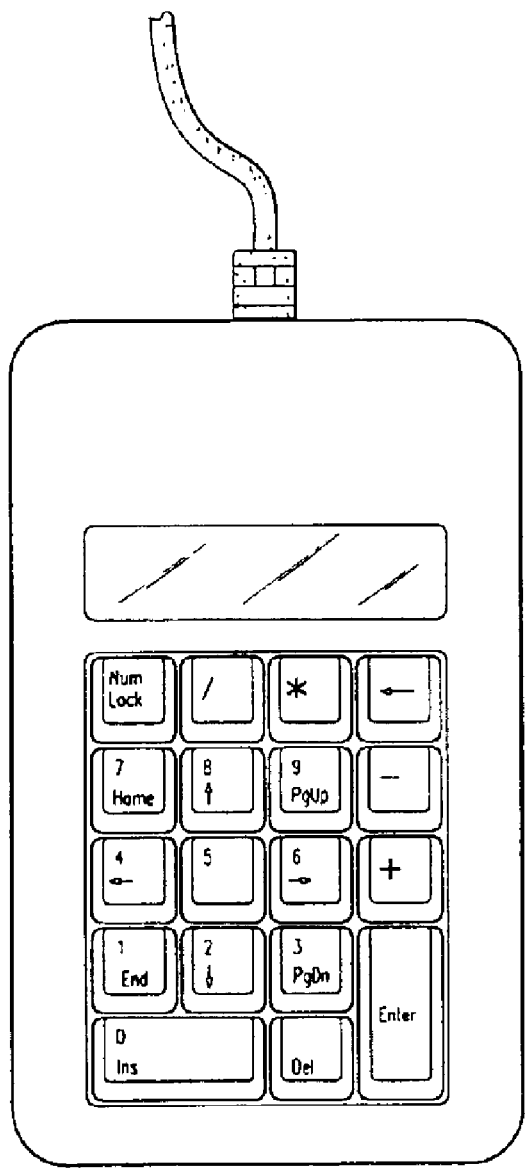
FIG. 3 is a top plan view of a conventional keypad connectable to a notebook computer.
Figure 4:
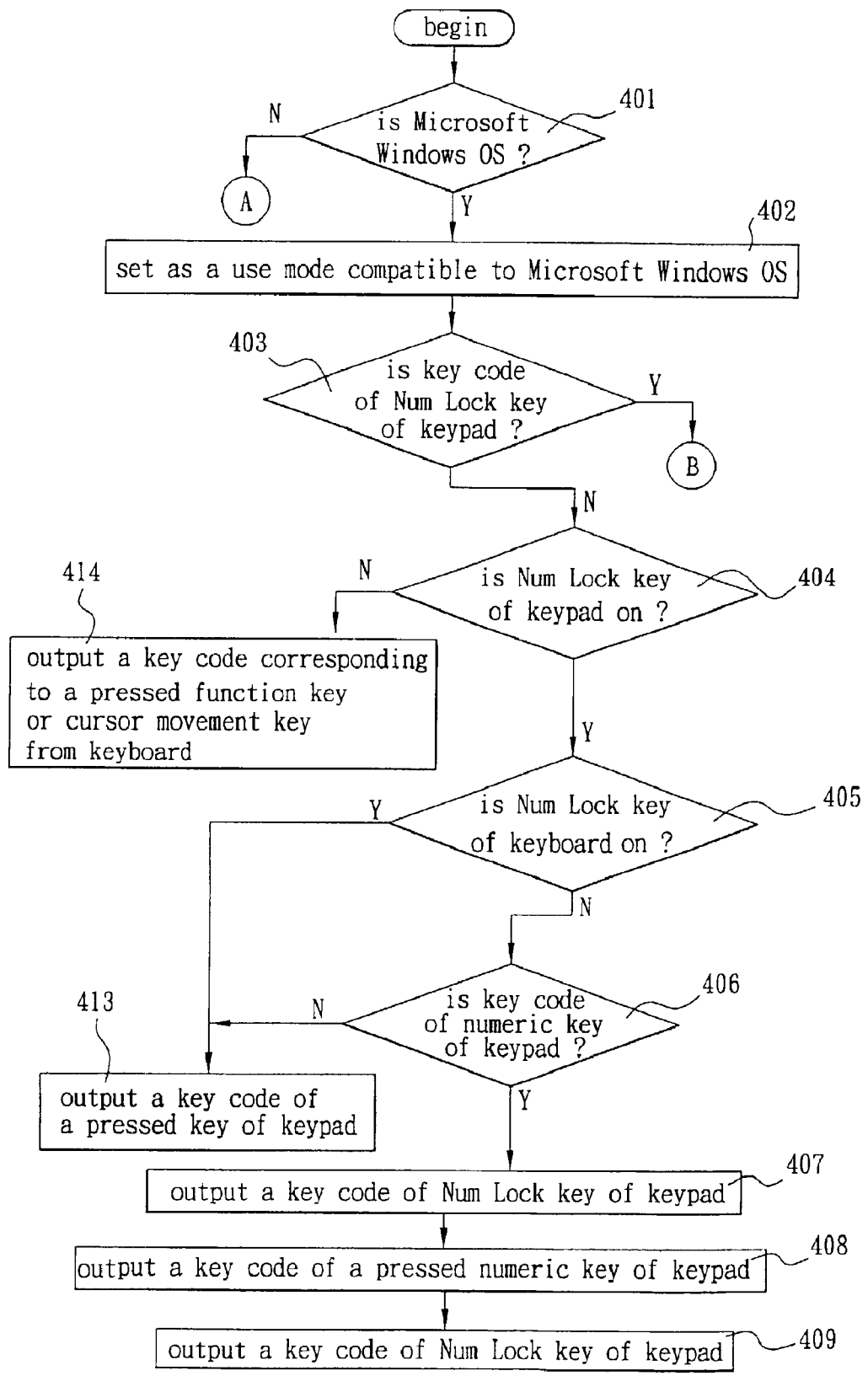
FIG. 4 is a flow chart illustrating a first process of command input in a keypad according to the invention.
Figure 5:
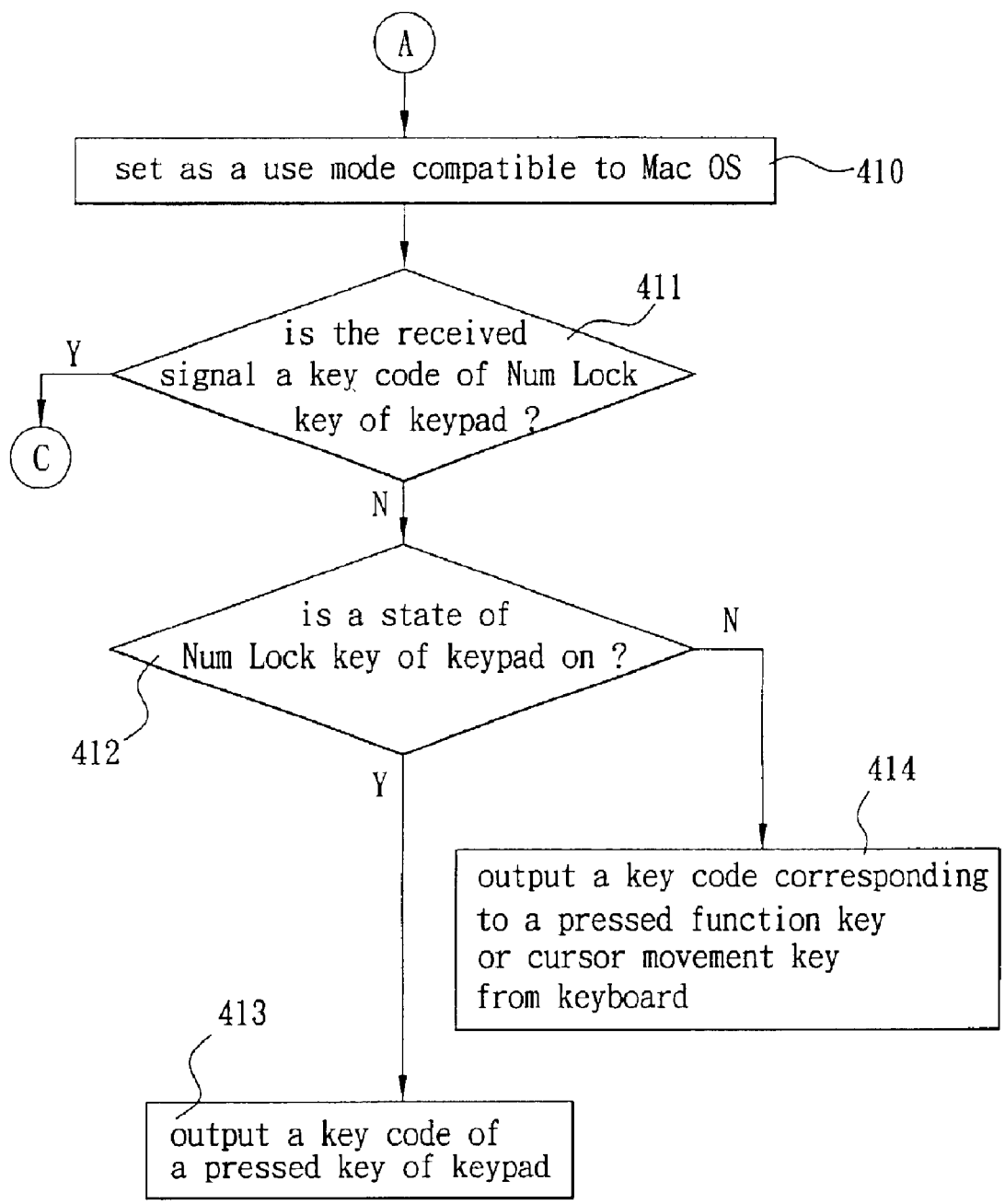
FIG. 5 is a flow chart illustrating a second process of command input in a keypad according to the invention.
Figure 6:
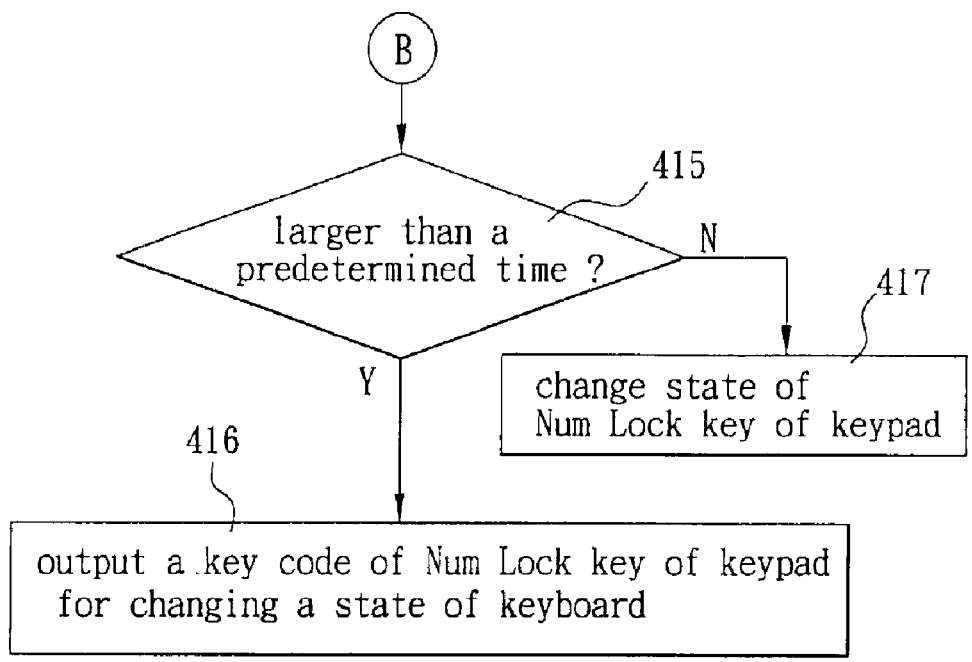
FIG. 6 is a flow chart illustrating a third process of command input in a keypad according to the invention.
Figure 7:
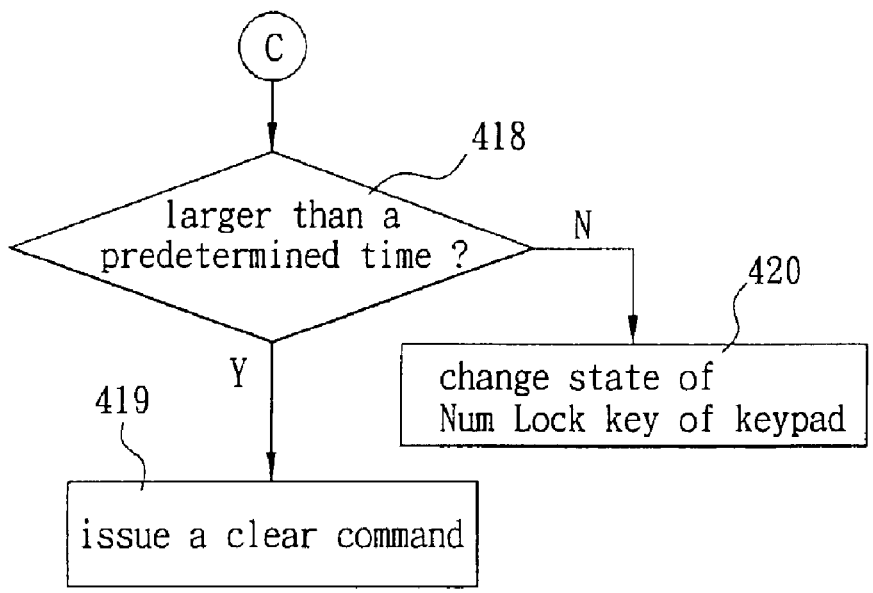
FIG. 7 is a flow chart illustrating a fourth process of command input in a keypad according to the invention.
Figure 8:
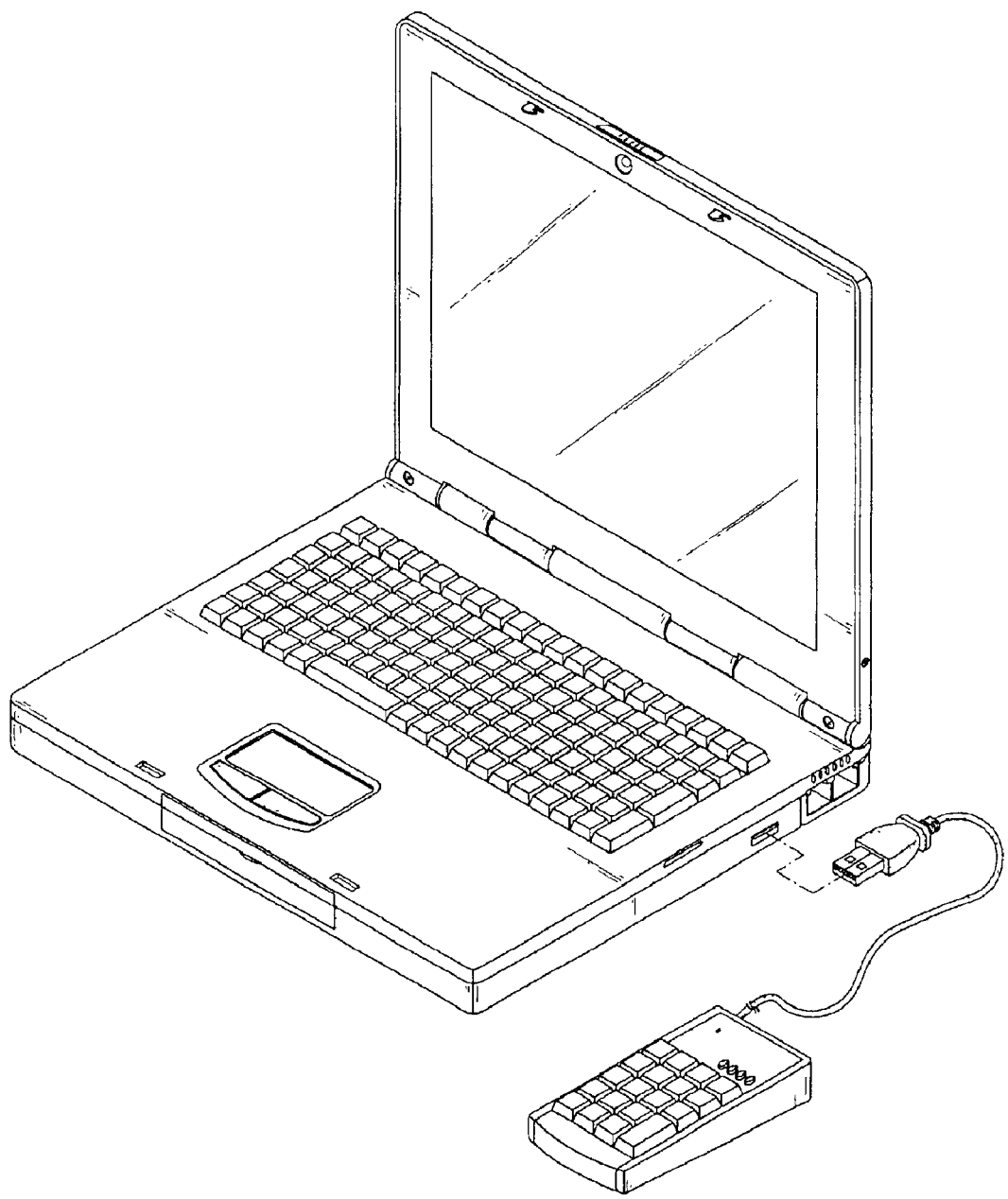
FIG. 8 is a perspective view of a notebook computer and the keypad of the invention connectable to the notebook computer.

In a preferred embodiment, the keypad is electrically coupled to the electronic device (e.g., a notebook computer) through the interface. Next, a signal data transfer between the keypad and the electronic device is effected. The keypad then performs the following steps as referring to FIGS. 4, 5, 6, 7, and 8.

First determine whether an OS incorporated in the electronic device is the Microsoft Windows OS (step 401). If yes, the process goes to step 402. Otherwise, the process jumps to step 410.

In step 402 the keypad is set as a use mode compatible to the Microsoft Windows OS.

In step 403 determine whether a received signal is a key code of Num Lock key of the keypad. If yes, the process jumps to step 415. Otherwise, the process goes to step 404.

In step 404 determine whether a state of Num Lock key of the keypad is on. If yes, the process goes to step 405. Otherwise, the process jumps to step 414.

In step 405 determine whether a state of Num Lock key of the keyboard is on. If yes, the process jumps to step 413. Otherwise, the process goes to step 406.

In step 406 determine whether the signal represents a key code of a numeric key (e.g., "." or one of digits 0 to 9) of the keypad. If yes, the process goes to step 407. Otherwise, the process jumps to step 413.

In step 407 send out a key code of Num Lock key of the keypad for changing a state of the Num Lock key of the keyboard.

In step 408 again send out a key code of a pressed key of the numeric keys of the keypad.

In step 409 finally send out the key code of Num Lock key of the keypad for returning to the original state of the Num Lock key of the keyboard.

In step 410 the keypad is set as another use mode compatible to the Mac OS.

In step 411 determine whether the received signal is a key code of the Num Lock key of the keypad. If yes, the process jumps to step 418. Otherwise, the process goes to step 412.

In step 412 determine whether a state of Num Lock key of the keypad is on. If yes, the process goes to step 413. Otherwise, the process jumps to step 414

In step 413 send out a key code of a pressed key of the keypad.

In step 414 send out a key code corresponding to a pressed function key (e.g., Page Up, Page Down, Home, End, Insert, or Delete key) or cursor movement key from the keyboard.

In step 415 determine whether a pressing time of the Num Lock key of the keypad has exceeded a predetermined time. If yes, the process goes to step 416. Otherwise, the process jumps to step 417.

In step 416 directly send out a key code of the Num Lock key of the keypad to the electronic device for changing a state of the keyboard.

In step 417 only the state of the Num Lock key of the keypad is changed.

In step 418 determine whether a pressing time of the Num Lock key of the keypad has exceeded a predetermined time. If yes, the process goes to step 419. Otherwise, the process jumps to step 420.

In step 419 issue a clear command to the electronic device.

In step 420 the state of the Num Lock key of the keypad is changed.

In brief, the keypad can automatically set its use mode regardless of the Microsoft Windows OS of Mac OS being incorporated as the OS of the electronic device. When a numeric key is pressed and a subsequent determination of a state of the Num Lock key of the keypad is off, a key code of the keyboard corresponding to a pressed function key or cursor movement key is sent out. This can eliminate a number of disadvantages experienced in the prior art. For example, a user cannot correctly operate a keypad in a computer incorporated the Mac OS. Also, specific functions of certain application programs cannot be correctly activated on the keypad under the Microsoft Windows OS. Importantly, the invention can determine a pressing time of the Num Lock key of the keypad for changing a state of the keyboard accordingly. This is not available in the well known keyboard. Most importantly, a normal issuing of key code signal from the keypad is not affected irrespective of an on or off of the Num Lock key of the keyboard of the electronic device. As a result, key code of a key pressed by user can be correctly and directly sent out.

While the invention has been described by means of specific embodiments, numerous modifications and variations could be made thereto by those skilled in the art without departing from the scope and spirit of the invention set forth in the claims.

What is claimed is:

1. A method for inputting commands through a keypad comprising the steps of:

the keypad receiving a signal from an electronic device or sending the signal to the electronic device;

determining a type of an operating system (OS) incorporated in the electronic device by the keypad; and setting the keypad as a first use mode compatible with the determined OS based on the type of the determined OS;

whereby, in the first use mode, of the keypad states of Num Lock keys of a keyboard and the keypad of the electronic device are independent without interaction therebetween, and the keypad is capable of inputting a key code coincident with the state of the Num Lock key of the keypad based on the current state of the Num Lock key thereof.

2. The method of claim 1, wherein the keypad comprises a keyboard controller for controlling normal operations of electronic components and circuitry of the keypad, and the keyboard controller comprises:

a buffer for storing a keystroke signal generated by a pressed key of the keypad; and a scan code being a key code of any of individual keys for comparing with a signal of the generated keystroke of the pressed key;

wherein the keyboard controller is capable of issuing an interrupt request to a CPU of the electronic device for requesting a halt of current executing tasks, assigning a task priority to the keypad, and requesting the CPU to give a priority to a processing of tasks of the keypad so that the CPU is capable of processing data contained in the signal issued by the keypad in real time.

3. The method of claim 2, wherein in response to a pressing of a key thereof the keypad performs the steps of:

generating a keystroke corresponding to the pressed key;

finding a corresponding key code from the scan code based on the keystroke;

storing the key code in the buffer;

issuing an interrupt request to the CPU by the keyboard controller;

loading a service program corresponding to the interrupt request and executing the same by the CPU; and reading the key code from the buffer by the CPU.

4. The method of claim 1, further comprising an interface for transferring data contained in the signal between the keypad and the electronic device.

5. The method of claim 4, wherein the interface is a USB interface.

6. The method of claim 1, wherein in response to an electrical coupling of the keypad and the electronic device the keypad performs the steps of:

(a) determining whether the OS incorporated in the electronic device is a first OS that switches between alphabetic and numeric key functions upon pressing of the Num Lock key;

(b) setting the keypad as the first use mode compatible to the first OS if the determination of the step (a) is positive;

(c) determining whether a state of the Num Lock key of the keypad is on if the determination of the step (d) is negative;

(e) determining whether a state of the Num Lock key of the keyboard is on if the determination of the step (d) is positive;

(f) determining whether the signal represents a key code of a numeric key of the keypad if the determination of the step (e) is negative;

(g) sending out a key code of the Num Lock key of the keypad for changing the state of the Num Lock key of the keyboard if the determination of the step (f) is positive;

(h) sending out a key code of a pressed key of the numeric keys of the keypad; and (i) sending out the key code of the Num Lock key of the keypad for returning to an original state of the Num Lock key of the keyboard.

7. The method of claim 6, wherein in response to the determination of the step (a) that the OS incorporated in the electronic device is not the first OS, the electronic device the keypad performs the steps of:

(j) setting the keypad as a second use mode compatible to a second OS that is incapable of switching between alphabetic and numeric functions upon pressing of the Num Lock key;

(k) determining whether the received signal is the key code of the Num Lock key of the keypad;

(l) determining whether the state of the Num Lock key of the keypad is on if the determination of the step (k) is negative; and (m) sending out a key code of a pressed key of the keypad if the determination of the step (l) is positive.

8. The method of claim 7, further comprising the step of (n) sending out a key code corresponding to a pressed function key or a cursor movement key from the keyboard if the determination of the step (l) is negative.

9. The method of claim 7, further comprising the steps of:

(o) determining whether a pressing time of the Num Lock key of the keypad has exceeded a predetermined time if the determination of the step (k) is positive; and (p) directly sending out the key code of the Num Lock key of the keypad to the electronic device for changing a state of the keyboard if the determination for the step (o) is positive.

10. The method of claim 9, further comprising the step of only changing the state of the Num Lock key of the keypad if the determination of the step (o) is negative.

11. The method of claim 7, further comprising the steps of:

(q) determining whether the pressing time of the Num Lock key of the keypad has exceeded the predetermined time if the determination of the step (k) is positive; and (r) issuing a clear command to the electronic device if the determination of the step (q) is positive.

12. The method of claim 11, further comprising the step of changing the state of the Num Lock key of the keypad if the determination of the step (q) is negative.

13. The method of claim 7, further comprising the step of (s) sending out a key code corresponding to a pressed function key or a cursor movement key from the keyboard if the determination of the step (l) is negative.

14. The method of claim 6, further comprising the step of (t) sending out a key code of a pressed key of the keypad if the determination of the step (e) is positive.

15. The method of claim 6, further comprising the step of (u) sending out a key code of a pressed key of the keypad if the determination of the step (f) is negative.

16. The method of claim 4, wherein the interface is a USB interface.

* * * * *